United States Patent Office 3,457,216
Patented July 22, 1969

3,457,216
POLYPROPYLENE FILLERS
Jimmy S. Dew, Bartlesville, Okla., assignor to Phillips Petroleum Company, a corporation of Delaware
No Drawing. Filed Dec. 27, 1966, Ser. No. 604,643
Int. Cl. C08g 45/04
U.S. Cl. 260—41                                   2 Claims

ABSTRACT OF THE DISCLOSURE

Physical properties of compounded polypropylene are improved by incorporating therein talc and either titania or calcium carbonate.

In certain applications of polypropylene it is desirable that the compounded polymer exhibit a relatively high flexural modulus. It is generally known that high modulus can be obtained by high loading, e.g., high filler concentrations. However, it is not always possible to obtain the desired high flexural modulus in combination with other desired properties such as tensile strength, impact strength, and the like, simply by increasing filler concentration. Indeed, as filler concentration is increased, a point is reached at which the composition loses strength and becomes what is known in the trade as "cheesy."

I have found that high modulus values can be achieved at a given filler loading by using a novel filler combination. These inventive compositions have numerous applications, such as for example, in phonograph records, washing machine agitators, television cabinets, etc.

It is therefore one object of this invention to provide a new and improved polypropylene filler composition. It is another object of this invention to provide compounded polypropylene having improved flexural modulus.

Other aspects, objects and the several advantages of this invention will be apparent to one skilled in the art from a study of this disclosure and the appended claims.

In accordance with one embodiment of this invention, polypropylene is compounded with a filler composition comprising talc and either titania or calcium carbonate.

I have found that polypropylene compounded with this filler combination exhibits flexural modulus in excess of that expected to result from similar loadings of either filler component singularly, and also in excess of that expected from the values lying on a straight line connecting the flexural moduli of the pure materials. It is thus apparent that a synergistic effect is obtained between the two filler components, and that this synergistic effect is present at all ratios of the two filler components. However, it is presently preferred that the concentration of talc relative to that of titania or calcium carbonate (on a weight basis) be within the range of from about 20:1 to about 0.1:1.

Although the inventive novel filler can be used in any proportion relative to polymer, it is presently preferred that from about 20 to about 80 weight percent total filler, based on polymer plus filler, be employed to obtain the properties desired in most applications.

The filler composition of this invention is used in compounding polypropylene. In this regard essentially any polypropylene can be used, such as those polymers produced with the well-known organometal catalyst systems. Small amounts, up to about 10 weight percent, of other monomers such as ethylene, butene-1, and the like, can be copolymerized with the propylene.

It is within the scope of the invention to incorporate small amounts of antioxidants, UV stabilizers, nucleating agents, pigments, dyes, and the like in the filled polypropylene of the invention.

The concept of this invention is illustrated by the following example, which is not intended to be limiting.

Example

Polypropylene made with a diethylaluminum chloride-$TiCl_3 \cdot \frac{1}{3} AlCl_3$ catalyst system and having a melt flow (ASTM D1238–62T, Condition L) of 4.1 g./10 min., a density (ASTM D1505–63T) of 0.905 g./cc., and a flexural modulus (ASTM D790–63) of 210 p.s.i.$\times 10^{-3}$, was used in the filled blends of the invention. The blends were made by mixing 5 minutes in a C. W. Brabender plastograph at 190° C. and 75 r.p.m. under a nitrogen blanket. Each blend contained 60 weight percent filler. Test specimens were prepared by compression molding.

The results of these operations are illustrated by the following tables.

| Wt. percent of total filler | | Flexural modulus, p.s.i.$\times 10^{-3}$ | |
|---|---|---|---|
| Talc [1] | Titania [2] | Found | Expected |
| 100 | 0 | 600 | |
| 95 | 5 | 1,050 | 580 |
| 90 | 10 | 1,000 | 570 |
| 85 | 15 | 800 | 560 |
| 80 | 20 | 650 | 550 |
| 70 | 30 | 850 | 530 |
| 20 | 80 | 670 | 424 |
| 0 | 100 | 380 | |

[1] Fisher Scientific Company.
[2] Titanium Pigment Corporation Titanox RA-40.

| Wt. percent of total filler | | Flexural modulus, p.s.i.$\times 10^{-3}$ | |
|---|---|---|---|
| Talc [1] | $CaCO_3$ [2] | Found | Expected |
| 100 | 0 | 600 | |
| 83 | 17 | 900 | 560 |
| 67 | 33 | 900 | 515 |
| 50 | 50 | 825 | 475 |
| 20 | 80 | 675 | 400 |
| 0 | 100 | 350 | |

[1] Fisher Scientific Company.
[2] Wyandotte Chemicals Corporation Purecal 0.

In each instance the flexural moduli of the blends were substantially in excess of those obtained by using the same total amount of either filler singularly, and were also higher than would be expected from the values lying on a straight line connecting the flexural moduli of the pure materials. It is apparent, therefore, that these data illustrate the described synergism for flexural modulus compared with the value expected from the straight line connecting the flexural modulus for the two pure materials.

I claim:
1. A composition comprising polypropylene and a filler comprising talc and titania wherein said filler is about 60 weight percent based on polypropylene plus filler and wherein the weight ratio of talc to said titania is within the range of from about 95:5 to about 20:80.
2. A composition comprising polypropylene and a filler comprising talc and calcium carbonate wherein said filler is about 60 weight percent based on polypropylene plus filler and wherein the weight ratio of talc to said calcium carbonate is within the range of from about 83:17 to about 20:80.

References Cited
UNITED STATES PATENTS
3,157,614  11/1964  Fischer _____ 260—41
3,228,883   1/1966  Giulio _____ 260—41

MORRIS LIEBMAN, Primary Examiner
S. L. FOX, Assistant Examiner